(12) United States Patent
DeCusatis (10) Patent No.: US 9,331,784 B2
(45) Date of Patent: May 3, 2016

(54) DYNAMIC TUNABLE LOW LATENCY CHROMATIC DISPERSION COMPENSATOR

(75) Inventor: Casimer M. DeCusatis, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1553 days.

(21) Appl. No.: 12/266,698

(22) Filed: Nov. 7, 2008

(65) Prior Publication Data

US 2010/0119237 A1    May 13, 2010

(51) Int. Cl.
*H04B 10/2519* (2013.01)
*H04B 10/2507* (2013.01)
*H01S 3/067* (2006.01)

(52) U.S. Cl.
CPC ........ *H04B 10/2519* (2013.01); *H04B 10/2507* (2013.01); *H01S 3/067* (2013.01)

(58) Field of Classification Search
CPC . H04B 10/2519; H04B 10/2507; H01S 3/067
USPC ......................................................... 398/147
See application file for complete search history.

(56) References Cited

U.S. PATENT DOCUMENTS

| 5,602,949 | A | | 2/1997 | Epworth |
| 5,608,742 | A | * | 3/1997 | Petersen ........................... 372/6 |
| 5,870,417 | A | * | 2/1999 | Verdiell et al. ................... 372/32 |
| 6,055,081 | A | | 4/2000 | Koyano et al. |
| 6,356,684 | B1 | | 3/2002 | Patterson et al. |
| 6,590,684 | B1 | * | 7/2003 | Goodfellow ................... 398/149 |
| 7,667,679 | B2 | | 2/2010 | Park et al. |
| 2002/0197028 | A1 | | 12/2002 | Suzuki et al. |
| 2004/0017972 | A1 | | 1/2004 | Lelievre et al. |
| 2004/0101239 | A1 | | 5/2004 | Parker |
| 2004/0101241 | A1 | | 5/2004 | Kohnke et al. |
| 2004/0161197 | A1 | | 8/2004 | Pelletier et al. |
| 2004/0208649 | A1 | | 10/2004 | Matthews et al. |
| 2005/0220399 | A1 | | 10/2005 | Alberti et al. |
| 2007/0140692 | A1 | * | 6/2007 | DeCusatis et al. .............. 398/57 |

OTHER PUBLICATIONS

Kashyap et al., "1.3m long super-step-chirped fibre Bragg grating with a continuous delay of 13.5ns and bandwidth 10n, for broadband dispersion compensation," Sep. 12, 1996, Electronics Letters, vol. 32, No. 19, pp. 1807-1809.
U.S. Appl. No. 12/266,708—Non-Final Office Action dated Jun. 19, 2009.

(Continued)

*Primary Examiner* — Xinning Niu
(74) *Attorney, Agent, or Firm* — Cantor Colburn LLP; Steven Chiu (57) ABSTRACT

A dynamic tunable chromatic dispersion compensator with low latency is provided that includes a chirped fiber Bragg grating in a compensating optical fiber core. The chirped fiber Bragg grating includes wavelength gratings spaced at distances varying with respect to the length of the compensating optical fiber core to compensate for differential delay in a synchronous time protocol for a bidirectional computer data communication link. The dynamic tunable chromatic dispersion compensator also includes one or more controllable elements to modify the length of the compensating optical fiber core in response to one or more commands, and an optical junction to optically couple the chirped fiber Bragg grating to an optical fiber of the bidirectional computer data communication link.

19 Claims, 4 Drawing Sheets

(56) References Cited

OTHER PUBLICATIONS

U.S. Appl. No. 12/266,708 filed on Nov. 7, 2008.
Benjamin J. Eggleton, et al., Electrically Tunable Power Efficient Dispersion Compensating Fiber Bragg Grating, IEEE Photonics Technology Letters, vol. 11, No. 7, Jul. 1999, 3 pages.
B.J. Eggleton, et al., Integrated Tuable Fiber Gratings for Dispersion Management in High-Bit Rate Systems, Journal of Lightwave Technology, vol. 18, No. 10, Oct. 2000, 15 pages.
N.Q. Ngo, et al., Electrically Tunable Dispersion Compensator With Fixed Center Wavelength Using Fiber Bragg Grating, Journal of Lightwave Technology, vol. 21, No. 6, Jun. 2003, 8 pages.

Pavel Ivanoff Reyes, et al., 160-Gb/s Tunable Dispersion Slope Compensator Using a Chirped Fiber Bragg Grating and a Quadratic Heater, IEEE Photonics Technology Letters, vol. 17, No. 4, Apr. 2005, 3 pages.
S.S. Lee, et al., Continuous photonic microwave true-time delay using tapered chirped fibre Bragg grating, Electronics Letters Jun. 9, 2005, vol. 41, No. 12, 2 pages.
Jaejoong Kwon, et al., Tunable Dispersion Slope Compensator Using a Chirped Fiber Bragg Grating Tuned by a Fan-Shaped Thin Metallic Heat Channel, IEEE Photonics Technology Letters, vol. 18, No. 1, Jan. 1, 2006, 3 pages.

\* cited by examiner

DYNAMIC TUNABLE LOW LATENCY CHROMATIC DISPERSION COMPENSATOR

BACKGROUND

The present invention relates to communication networks, and more specifically, to providing a dynamic frequency tunable low latency chromatic dispersion compensator for latency-sensitive networks.

In optical communication systems, chromatic dispersion of light signals propagating over long distances causes light pulses to spread out as they travel along an optical fiber. Chromatic dispersion occurs because different spectral components at different wavelengths in a pulse travel at slightly different speeds. For example, in normal dispersion situations, short wavelengths (blue) travel faster than long wavelengths (red). First-order chromatic dispersion, D, is given in ps/nm-km by the expression:

$$D = \frac{S_0}{4}\left(\lambda_c - \frac{\lambda_0^4}{\lambda_c^3}\right)$$

In this expression, $\lambda_0$ is the fiber's zero dispersion wavelength, $S_0$ is the fiber's zero dispersion slope, and $\lambda_c$ is the operating center wavelength. The resulting pulse spread can cause pulses in succession to overlap and interfere with each other, producing bit errors. The optical power penalty associated with first order dispersion, $P_d$, is given (in dB) by:

$$P_d = 5 \log(1+2\pi(BD\Delta\lambda)^2 L^2)$$

In this expression, B is the bit rate, L is the link length, and $\Delta\lambda$ is the root mean square (RMS) spectral width of the source. Dispersion can become a limiting factor in optical communication systems, since it grows worse for longer links and higher bit rates. Higher order dispersion effects and/or time varying dispersion effects can have differing impacts on transmission integrity. For example, transmitted wavelengths can experience a larger degree of change than others traveling through the same path, where the actual degree of change varies with respect to time. Additionally, ageing and voltage variations in transmission equipment can reduce the effectiveness of static dispersion compensation techniques.

SUMMARY

According to one embodiment of the present invention, a dynamic tunable chromatic dispersion compensator with low latency is provided that includes a chirped fiber Bragg grating in a compensating optical fiber core. The chirped fiber Bragg grating includes wavelength gratings spaced at distances varying with respect to the length of the compensating optical fiber core to compensate for differential delay in a synchronous time protocol for a bidirectional computer data communication link. The dynamic tunable chromatic dispersion compensator also includes one or more controllable elements to modify the length of the compensating optical fiber core in response to one or more commands, and an optical junction to optically couple the chirped fiber Bragg grating to an optical fiber of the bidirectional computer data communication link.

An additional embodiment is a system that includes an optical fiber in a bidirectional computer data communication link to support optical communication between servers, and a dynamic tunable chromatic dispersion compensator coupled to the optical fiber. The dynamic tunable chromatic dispersion compensator has a low latency, and includes a chirped fiber Bragg grating in a compensating optical fiber core. The chirped fiber Bragg grating includes wavelength gratings spaced at distances varying with respect to the length of the compensating optical fiber core to compensate for differential delay in a synchronous time protocol for a bidirectional computer data communication link. The dynamic tunable chromatic dispersion compensator also includes one or more controllable elements to modify the length of the compensating optical fiber core in response to one or more commands, and an optical junction optically coupling the chirped fiber Bragg grating to the optical fiber in the bidirectional computer data communication link.

A further embodiment is a method that includes receiving an output pulse from a dynamic tunable chromatic dispersion compensator with low latency. The dynamic tunable chromatic dispersion compensator includes a chirped fiber Bragg grating in a compensating optical fiber core, the chirped fiber Bragg grating includes wavelength gratings spaced at distances varying with respect to the length of the compensating optical fiber core to compensate for differential delay in a synchronous time protocol for a bidirectional computer data communication link. The dynamic tunable chromatic dispersion compensator also includes one or more controllable elements to modify the length of the compensating optical fiber core in response to one or more commands. The method further includes filtering the output pulse with an optical bandpass filter to produce a filtered version of the output pulse. The method additionally includes comparing the output pulse to the filtered version of the output pulse, and commanding an adjustment to the length of the compensating optical fiber core in response to the comparing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The invention as described herein provides a dynamic tunable low latency chromatic dispersion compensator for latency-sensitive networks. Differential time sensitive protocols (e.g., a synchronous time protocol) may be used in high-reliability computer systems, where servers operate synchronously for synchronous disaster recovery and business continuity applications. One example of such as protocol is Server Time Protocol (STP). STP is a synchronous time protocol that embeds time stamps within data streams, allowing multiple servers to synchronize themselves to a common time-of-day clock. Latency compensation for bidirectional links may be used to maintain a common time base with a high degree of accuracy between the servers. A bidirectional link between two servers can include separate fibers for transmission in each direction to and from the servers. If the length of the fibers in each direction of the bidirectional link varies substantially, e.g., over 900 meters, the resulting latency variation in each direction can cause synchronization errors, since it takes a greater amount of time to transmit in one direction versus the opposite direction.

STP may be transported on optical fibers using a multiplexing technique that merges multiple wavelengths and/or frequencies to increase throughput. An example of such a multiplexing technique is wavelength division multiplexing (WDM). WDM switches multiple optical carrier signals on an optical fiber by using different wavelengths of laser light to carry different signals. In a WDM system, pulses at different wavelengths typically suffer different amounts of dispersion. Another example of a multiplexing technique that can be used to increase the throughput of STP is time division multiplexing (TDM). TDM can multiplex several lower data rate signals onto a higher aggregate data rate carrier (e.g., 10 Gbit/s, 40 Gbit/s, or 100 Gbit/s), where higher data rates are more susceptible chromatic dispersion errors.

As the data rate and distance for STP links increases, for example, over 100 km, chromatic dispersion compensation may be performed. Static chromatic dispersion compensation may be useful in reducing the effects of first order chromatic dispersion to reduce pulse spreading over long distances. However, other effects can impact performance, particularly at higher data rates. To maintain high bandwidth communication, different levels of dispersion correction may be applied over time (e.g., due to changes in the attached WDM equipment, ageing or thermal/voltage effects which cause laser center wavelengths to drift over time, etc.). Some of the critical factors that affect dispersion compensation include changing traffic or modulation patterns, temperature fluctuations along the fiber, modulation format, component dispersion levels and dispersion variations in the transmission fiber (e.g., from manufacturing variances).

In an exemplary embodiment, a low latency chromatic dispersion compensator (also referred to simply as a "compensator" herein) with a chirped fiber Bragg grating is inserted in the communication path (bidirectional link) between servers. A feedback controller can be used to monitor the output of the compensator and adjust the compensator to optimize performance. The feedback controller can be implemented in close proximity to the compensator, integrated with the compensator, or placed near/at the receiving server. The compensator includes feedback controllable elements that change the length of one or more segments of the chirped fiber Bragg grating in the compensator in response to commands. The additional path length of the compensator is minimal, (e.g., 3 meters or less) to minimize latency differences between compensated and uncompensated links. The chirped fiber Bragg grating recompresses optical signals that have spread due to chromatic dispersion, which enables higher throughput and/or longer distances between servers. Adding the compensator to fiber in only one direction of a bidirectional link has a near-zero differential latency impact, as the additional path length attributable to the compensator is negligible. Thus, the compensator provides low latency and low differential delay chromatic dispersion compensation relative to each direction of a bidirectional link. The feedback control can enable real-time adjustments for the compensator, as conditions that change dispersion characteristics vary. The dynamic tunable low latency chromatic dispersion compensator is described in greater detail herein.

Figure 1:
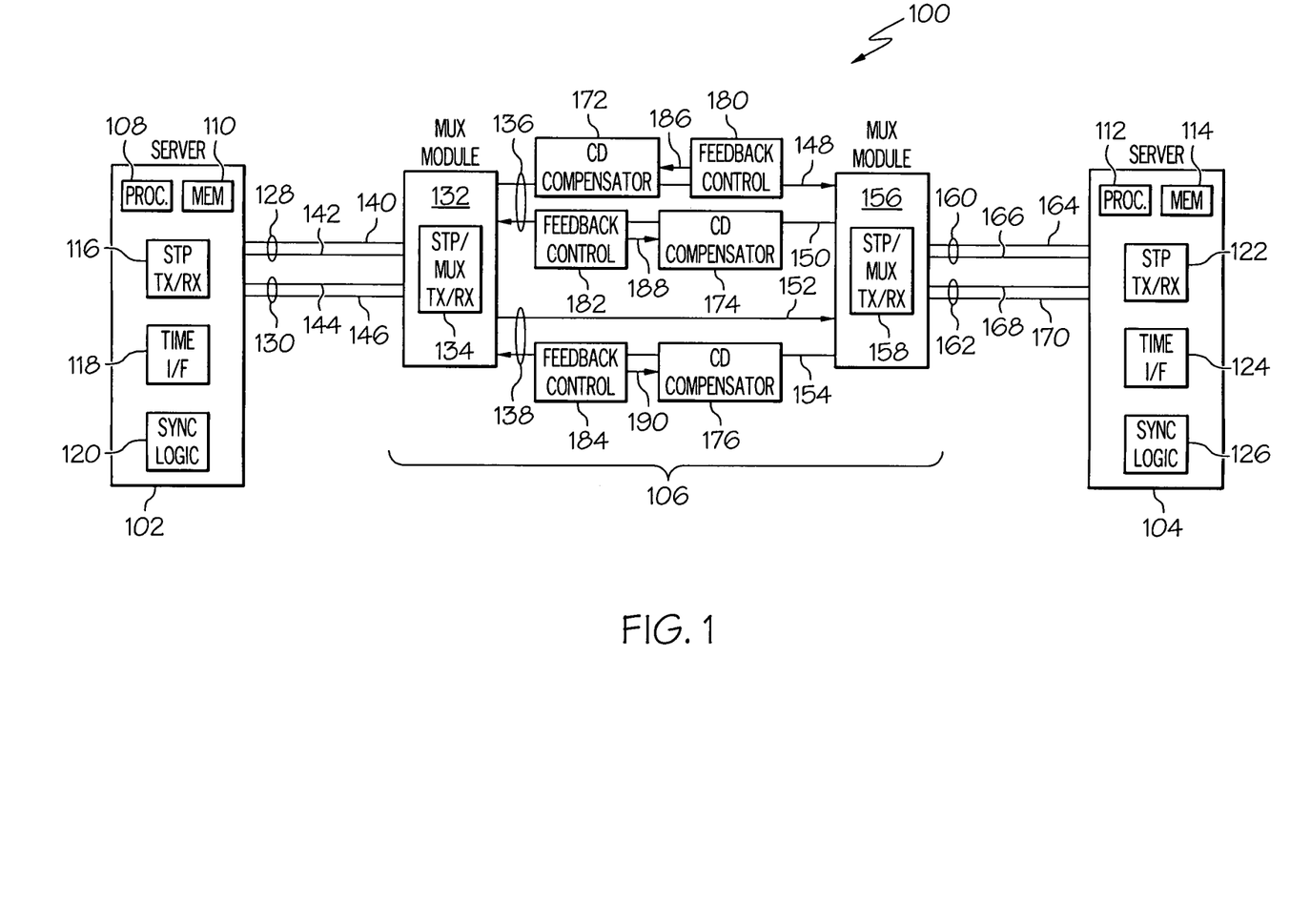
FIG. 1 depicts a block diagram illustrating a system that may be utilized to implement exemplary embodiments of the present invention.

Turning now to the drawings, it will be seen that in FIG. 1 there is a block diagram of a system 100 upon which dynamic tunable low latency chromatic dispersion compensation for latency-sensitive networks is implemented in exemplary embodiments. The system 100 of FIG. 1 includes a first server 102 in communication with a second server 104 over a network 106. The system 100 may be a systems complex (sysplex), where the servers 102 and 104 execute synchronously to each other under normal operating conditions. In an exemplary embodiment, the server 102 includes at least one processing circuit 108 (e.g., a CPU) capable of reading and executing instructions, as well as accessing memory 110. The processing circuit 108 may be a general purpose or application specific microprocessor, and/or can include multiple processing cores, e.g., a multi-core module (MCM). The memory 110 can be a combination of volatile and non-volatile memory, including cache and/or secondary storage, for program and/or data storage. Similarly, the server 104 includes at least one processing circuit 112 and memory 114, that may be the same technologies as described in reference to processing circuit 108 and memory 110.

The server 102 may include STP transmit and receive logic (TX/RX) 116 to transmit and receive data streams on the network 106 using a latency sensitive protocol. Time interface 118 accesses a time base, such as a time-of-day clock, that may be internal or external to the server 102, providing time information to sync logic 120. The sync logic 120 maintains synchronization between the servers 102 and 104, and can synchronize the server 102 to other servers (not depicted) of the system 100. Similarly, the server 104 includes STP TX/RX 122, time interface 124, and sync logic 126 to provide substantially the same functionality as the STP TX/RX 116, time interface 118, and sync logic 120 of server 102.

The server 102 may communicate through multiple links 128 and 130 to a multiplexing (mux) module 132. The mux module 132 includes STP to/from mux conversion transmit and receive logic (STP/MUX TX/RX) 134 to convert STP data into a multiplexed format for long distance communications, e.g., over 40 km. The mux module 132 optically encodes and decodes data on one or more bidirectional fiber optic links, such as links 136 and 138, also referred to as bidirectional computer data communication links 136 and 138. In one embodiment, links 128 and 130 are also bidirectional fiber optic links. In an alternate embodiment, links 128 and 130 are wired or wireless electronic communication paths. The links 128 and 130 may be comprised of unidirectional links 140, 142, 144, and 146, providing communication paths to and from the server 102 and mux module 132. In an exemplary embodiment, the bidirectional computer data communication links 136 and 138 include optical fiber links 148, 150, 152, and 154 (or simply "optical fibers"), providing a communication path between mux module 132 and mux module 156. Similar to the mux module 132, the mux module 156 includes STP/MUX TX/RX 158 to convert multiplexed data from the bidirectional computer data communication links 136 and 138 to STP for the server 104, as well as conversion in the opposite direction. The mux module 156 and server 104 can communicate via bidirectional links 160 and 162, which may be further comprised of unidirectional links 164, 166, 168, and 170. The bidirectional links 160 and 162 may be similar to the bidirectional links 128 and 130.

To maintain integrity of communications over the bidirectional computer data communication links 136 and 138, chromatic dispersion compensators can be added. In the example depicted in FIG. 1, chromatic dispersion compensator 172 is on link 148, chromatic dispersion compensator 174 is on link 150, and chromatic dispersion compensator 176 is on link 154; however, chromatic dispersion compensation is not used on link 152. The chromatic dispersion compensators 172-176 provide near-zero latency chromatic dispersion compensation for the bidirectional computer data communication links 136 and 138. In an exemplary embodiment, the chromatic dispersion compensators 172-176 use feedback-controlled optics to perform chromatic dispersion compensation. Feedback controls 180, 182, and 184 can be used to control chromatic dispersion compensation in the chromatic dispersion compensators 172-176 respectfully. For example, feedback control 180 can monitor the output of chromatic dispersion compensator 172 to determine its effectiveness in reducing pulse spreading. The feedback control 180 may determine that specific wavelengths have shifted, resulting in reduced effectiveness of the chromatic dispersion compensator 172. In response to the determination, the feedback control 180 sends a corresponding command on feedback command link 186 to adjust compensation in the chromatic dispersion compensator 172. Similarly, feedback control 182 sends commands on feedback command link 188 to adjust compensation in the chromatic dispersion compensator 174, and feedback control 184 sends commands on feedback command link 190 to adjust compensation in the chromatic dispersion compensator 176.

Although FIG. 1 depicts two servers 102 and 104 in communication via a combination of links 128, 130, 136, 138, 160, and 162 through mux modules 132 and 156, the scope of the invention is not so limited. It will be understood that any number of links can be used to maintain low-latency differential communication between two or more servers with optical fibers. Moreover, the mux modules 132 and 156 can be incorporated in the servers 102 and 104. The mux modules 132 and 156 can use a variety or combination of multiplexing techniques to transport time synchronous protocol data with multiple wavelengths and/or frequencies via bidirectional computer data communication links 136 and 138. Examples of multiplexing techniques include wave division multiplexing (WDM) and time division multiplexing (TDM). Furthermore, the feedback controls 180-184 can be located at any point after compensation of their respective chromatic dispersion compensators 172-176. For example, feedback control 180 can be combined with chromatic dispersion compensator 172, mux module 156, or server 104. Additionally, the feedback control 180 can be located at any point on the optical fiber link 148 or an optical fiber link of the bidirectional link 160 providing communication from the mux module 156 to the server 104. The command links 186-190 may employ electrical, optical, and/or wireless communication.

Figure 2:
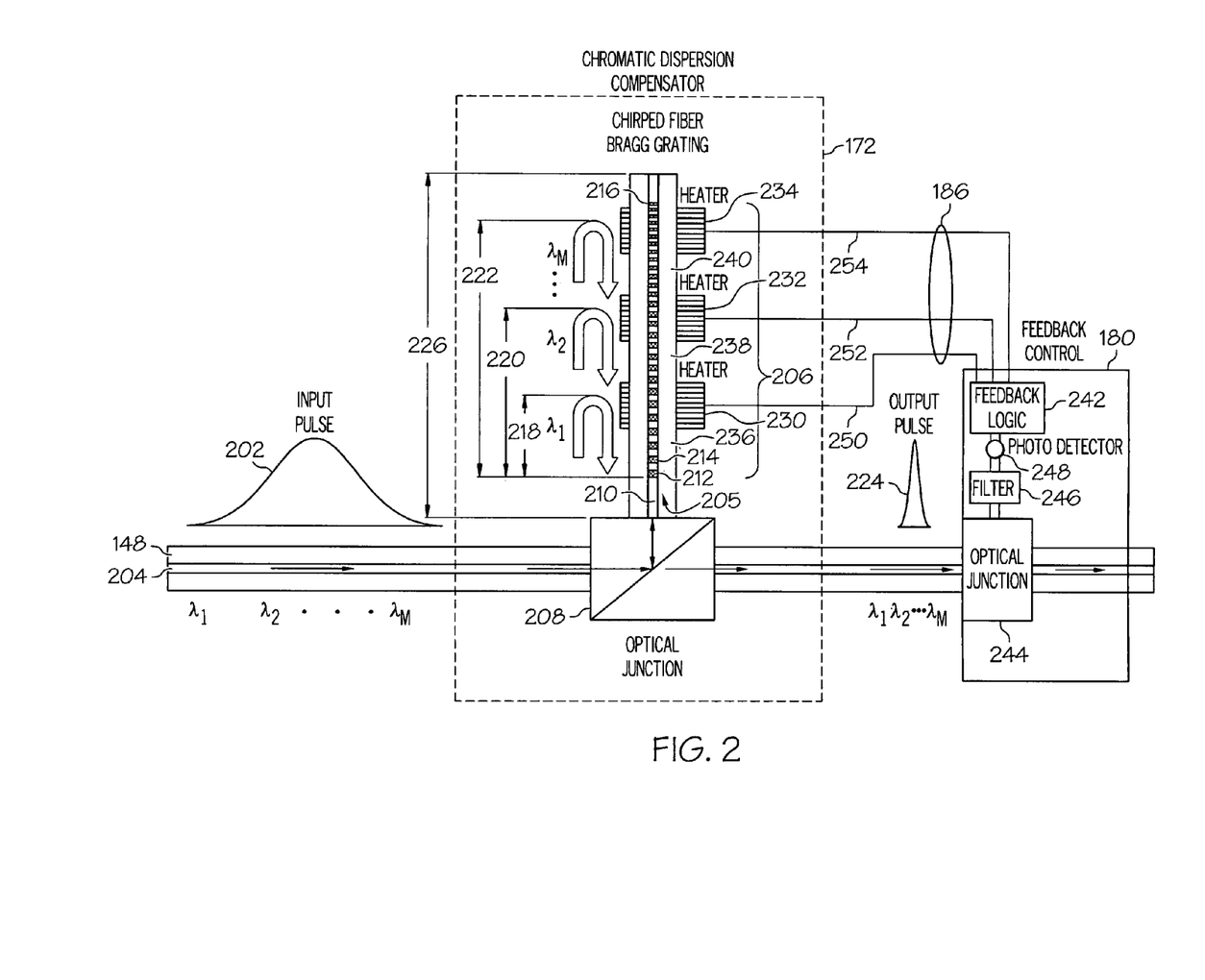
FIG. 2 depicts an example of a dynamic tunable low latency chromatic dispersion compensator and feedback logic in accordance with exemplary embodiments.

FIG. 2 depicts an example of chromatic dispersion compensator 172 and feedback control 180 of FIG. 1 in accordance with exemplary embodiments. The chromatic dispersion compensator 172 provides low differential delay compensation on link 148 relative to link 150 of FIG. 1, adding near-zero latency to optical pulses that are compensated. An example of an input pulse 202 in link 148 is depicted prior to reaching the chromatic dispersion compensator 172. The input pulse 202 is comprised of multiple wavelengths ($\lambda_1, \lambda_2 \ldots, \lambda_M$) that become spread or broadened as it propagates in optical fiber core 204 of the link 148. Shorter wavelengths ($\lambda_M$) travel faster than longer wavelengths, such as $\lambda_2$ and $\lambda_1$, resulting in further spreading over greater distances. The chromatic dispersion compensator 172 performs chromatic dispersion compensation using a chirped fiber Bragg grating 206 in a compensating optical fiber 205. The chirped fiber Bragg grating 206 receives the input pulse 202 traveling through the link 148 using optical junction 208. The optical junction 208 may be an optical splitter, tap, or circulator.

The chirped fiber Bragg grating 206 can be manufactured by selectively doping compensating optical fiber core 210 of the compensating optical fiber 205 to make it sensitive to ultraviolet light, then exposing the compensating optical fiber core 210 using a phase mask in a manner similar to conventional lithography. A pattern of alternating high and low refractive index is written into the compensating optical fiber core 210, which acts as a diffraction grating. Light propagating through the chirped fiber Bragg grating 206 is scattered by Fresnel reflection from each successive refractive index perturbation (refractive index perturbation 212, refractive index perturbation 214, up to refractive index perturbation 216), in the compensating optical fiber core 210. A periodic index perturbation with period P causes high reflectivity in the vicinity of the Bragg wavelength, defined as $\lambda_B = 2$ nP, where n is the effective modal index of the compensating optical fiber core 210. The light efficiency can approach 100% within a narrow wavelength window (1 nm or less) around the Bragg wavelength. The grating period can be made to vary linearly with distance in the compensating optical fiber core 210 to produce a chirped distribution of refractive index perturbations 212, 214 ... 216 (also referred to as wavelength gratings 212, 214 ... 216). As light with different wavelengths ($\lambda_1, \lambda_2 \ldots, \lambda_M$) passes through the chirped fiber Bragg grating 206, each refractive index perturbation 212, 214 ... 216, reflects a limited range of wavelengths while allowing the rest to pass through.

The chirped fiber Bragg grating 206 enables longer wavelengths to reflect earlier, while shorter wavelengths are reflected later, as the input pulse 202 travels in and reflects out of the chirped fiber Bragg grating 206. Thus, faster wavelengths experience a longer path length, while the slower wavelengths experience a shorter path length. For example, $\lambda_1$ travels an optically shorter path 218 in the chirped fiber Bragg grating 206 before reflecting as compared to optically longer paths 220 and 222 reflecting $\lambda_2$ and $\lambda_M$ in the chirped fiber Bragg grating 206 of the compensating optical fiber core 210. The net effect recompresses the spectrum of the input pulse 202 to the output pulse 224, which travels through the optical junction 208 back to the link 148. Even if two separate chromatic dispersion compensators (e.g., chromatic dispersion compensators 172 and 174) are used on the same bidirectional link (e.g., bidirectional computer data communication link 136), the differential delay is nearly zero (approximately 15 nanoseconds or less).

The length 226 of the compensating optical fiber core 210 may be approximately 3 meters of less, adding very little distance to the total optical path length between servers 102 and 104 of FIG. 1, which can be over 100 km. To minimize optical power losses attributable to the chromatic dispersion compensator 172, the diameter of the compensating optical fiber core 210 is equivalent to the optical fiber core 204 of the link 148 within a manufacturing tolerance. Reducing optical power losses due to compensation can extend the maximum distance at which the servers 102 and 104 can sustain high-speed time synchronous communications.

To further enhance the ability of the chromatic dispersion compensator 172 to adjust for higher order dispersion and other time varying effects, the chromatic dispersion compensator 172 may include one or more controllable elements that change the length of one or more segments of the compensating optical fiber 205. The example depicted in FIG. 2 includes heaters 230, 232, and 234 as controllable elements. The heaters 230-234 may use resistive heating elements to generate heat as a function of electrical current. The feedback control 180 can command the heaters 230-234 to apply non-uniform heating to stretch parts or segments of the chirped fiber Bragg grating 206, modifying the existing grating chirp from a linear chirp to a non-linear chirp. The compensating optical fiber 205 can be controlled as a collection of segments, such as segments 236, 238, and 240. Heater 230 can affect segment 236, heaters 230 and 232 can affect segment 238, and heaters 234 and 232 can affect segment 240. Controlling the amount of heating provides adjustable amplitude dispersion compensation. For example, a temperature change of 2 degrees C. applied to about one-half of the chirped fiber Bragg grating 206 (where the compensating optical fiber 205 is a standard fiber) may shift the effective dispersion compensation by 5 nanometers or more. Larger shifts can be achieved by thermally shifting multiple parts of the fiber Bragg grating (for example, independently controlling heaters 230-234) or by using different types of fiber to fabricate the chirped fiber Bragg grating 206.

In an exemplary embodiment, the heaters 230-234 are controlled by feedback logic 242 of feedback control 180. The feedback control 180 receives the output pulse 224 via optical junction 244. The optical junction 244 may be an optical splitter, tap, or circulator. The optical junction 244 is coupled to filter 246. The filter 246 may be a narrow linewidth optical bandpass filter, which passes a filtered version of the output pulse 224 to a photo detector 248. By measuring the intensity of light reaching the photo detector 248, the feedback logic 242 can determine whether the signal width is greater than the passband of the filter 246. The feedback logic 242 can drive control links 250, 252, and 254 of the feedback command link 186 to adjust compensation in the chromatic dispersion compensator 172. The control links 250-254 may employ electrical, optical, and/or wireless communication. The feedback logic 242 may drive the feedback command link 186 at a relatively slow rate (e.g., approximately a millisecond update rate) to allow time for thermal effects to stretch or contract the compensating optical fiber 205. The chromatic dispersion compensator 172 is adjusted until the received signal is at its peak value, indicating that the entire width of output pulse 224 is less than that of the filter 246. The feedback logic 242 may be implemented using one or more digital signal processors (DSPs), general-purpose processors, or dedicated circuitry. The feedback logic 242 can perform in real-time during exchanges in the synchronous time protocol on the bidirectional computer data communication link 136.

Although FIG. 2 depicts 3 heaters 230-234, it will be understood that any number of heaters can be used to further subdivide the compensating optical fiber 205 into any number of segments. In an alternate embodiment, the optical junctions 208 and 244 are merged to integrate the chromatic dispersion compensator 172 with the feedback control 180. In another alternate embodiment, the heaters 230-234 are driven in an open loop mode without monitoring the output of the chromatic dispersion compensator 172. In this mode of operation, the feedback control 180 can be omitted, and the heaters 230-234 may be driven by other means, such as an internal scheduler of the chromatic dispersion compensator 172 or servicing equipment.

Figure 3:
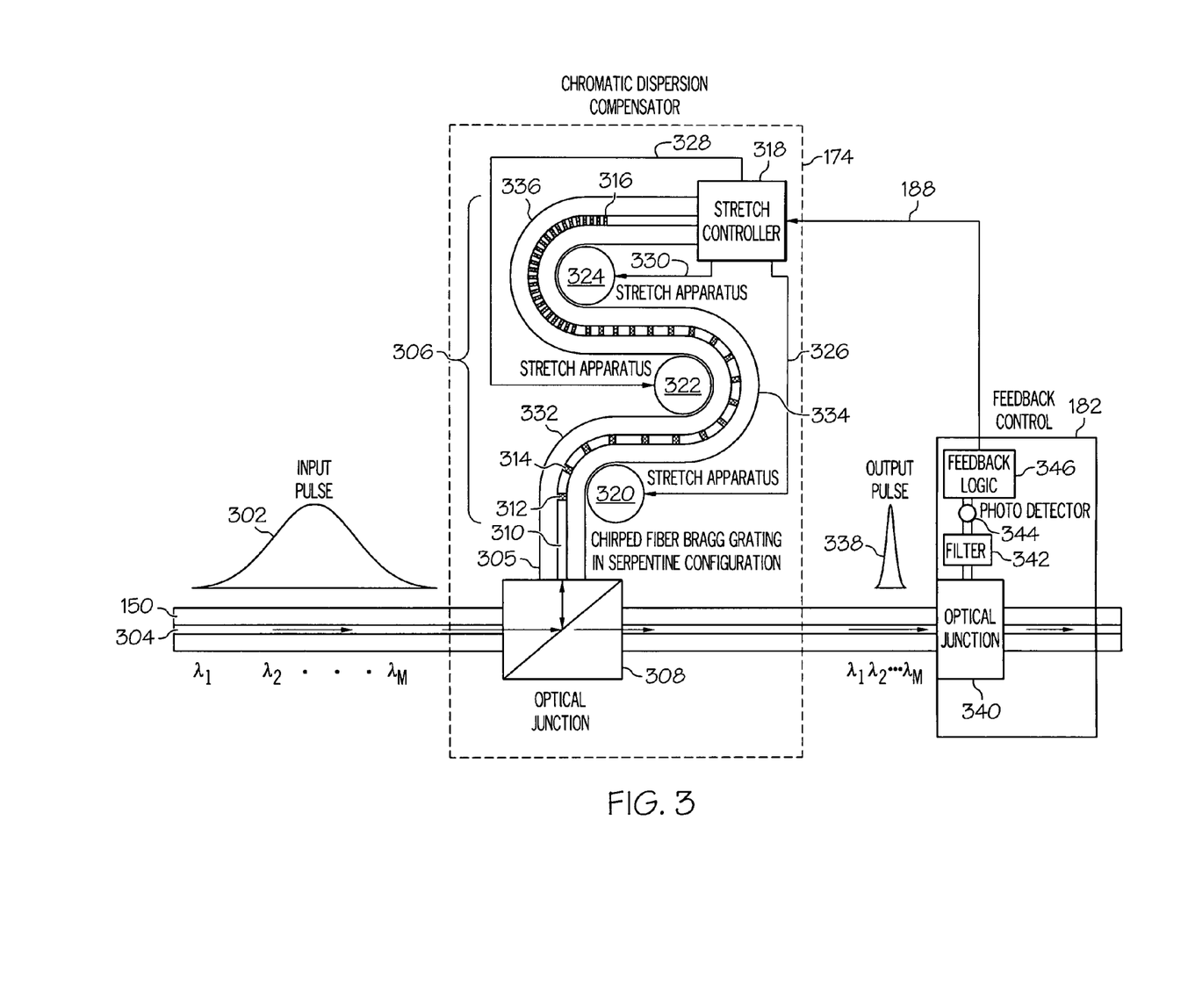
FIG. 3 depicts another example of a dynamic tunable low latency chromatic dispersion compensator and feedback logic in accordance with exemplary embodiments.

FIG. 3 depicts another example of a dynamic tunable low latency chromatic dispersion compensator and feedback logic in accordance with an exemplary embodiment. While the example depicted in FIG. 2 uses thermal means to control compensating fiber expansion and contraction, the example of FIG. 3 employs mechanical means to stretch compensating fiber to adjust chromatic dispersion compensation. FIG. 3 is an exemplary embodiment of chromatic dispersion compensator 174 and feedback control 182 of FIG. 1. The chromatic dispersion compensator 174 provides low differential delay compensation on link 150 relative to link 148 of FIG. 1. An example of an input pulse 302 in link 150 is depicted prior to reaching the chromatic dispersion compensator 174. The input pulse 302 is comprised of multiple wavelengths ($\lambda_1$, $\lambda_2 \ldots, \lambda_M$) that become spread or broadened as it propagates in optical fiber core 304 of the link 150. Shorter wavelengths ($\lambda_M$) travel faster than longer wavelengths, such as $\lambda_2$ and $\lambda_1$, resulting in further spreading over greater distances. Similar to the chromatic dispersion compensator 172, the chromatic dispersion compensator 174 performs chromatic dispersion compensation using a chirped fiber Bragg grating 306 in a compensating optical fiber 305. The chirped fiber Bragg grating 306 receives the input pulse 302 traveling through the link 150 using optical junction 308. The optical junction 308 may be an optical splitter, tap, or circulator.

The chirped fiber Bragg grating 306 can be manufactured by selectively doping compensating optical fiber core 310 of the compensating optical fiber 305 to make it sensitive to ultraviolet light, then exposing the compensating optical fiber core 310 using a phase mask in a manner similar to conventional lithography. A pattern of alternating high and low refractive index is written into the compensating optical fiber core 310, which acts as a diffraction grating. Light propagating through the chirped fiber Bragg grating 306 is scattered by Fresnel reflection from each successive refractive index perturbation (refractive index perturbation 312, refractive index perturbation 314, up to refractive index perturbation 316), in the compensating optical fiber core 310. A periodic index perturbation with period P causes high reflectivity in the vicinity of the Bragg wavelength, defined as $\lambda_B = 2\,nP$, where n is the effective modal index of the compensating optical fiber core 310. The light efficiency can approach 100% within a narrow wavelength window (1 nm or less) around the Bragg wavelength. The grating period can be made to vary linearly with distance in the compensating optical fiber core 310 to produce a chirped distribution of refractive index perturbations 312, 314 . . . 316 (also referred to as wavelength gratings 312, 314 . . . 316). As light with different wavelengths ($\lambda_1$, $\lambda_2 \ldots, \lambda_M$) passes through the chirped fiber Bragg grating 306, each refractive index perturbation 312, 314 . . . 316, reflects a limited range of wavelengths while allowing the rest to pass through.

The chirped fiber Bragg grating 306 enables longer wavelengths to reflect earlier, while shorter wavelengths are reflected later, as the input pulse 302 travels in and reflects out of the chirped fiber Bragg grating 306. In the chromatic dispersion compensator 174, the compensating optical fiber 305 and chirped fiber Bragg grating 306 are dynamically adjusted using mechanical stretching. The example of FIG. 3 depicts a serpentine configuration, where a stretch controller 318 commands stretch apparatuses 320, 322, and 324 via command links 326, 328, and 330 respectively. The stretch apparatuses 320-324 may be mechanical or electro-mechanical (e.g., piezoelectric) devices that stretch or release tension on segments 332, 334, and/or 336 of the chirped fiber Bragg grating 306. Applying non-uniform stretching to the segments 332-336 of the chirped fiber Bragg grating 306, can modify the existing grating chirp from a linear chirp to a non-linear chirp. The command links 326-330 can be mechanical linkages or signal paths to send mechanical or electrical commands to the stretch apparatuses 320-324. In alternate embodiments, the command links 326-330 can employ optical or wireless communication.

The stretch controller 318 may receive commands from feedback control 182 via feedback command link 188. The feedback control 182 receives an output pulse 338 via optical junction 340. The output pulse 228 represents compensated output of the chromatic dispersion compensator 174 on link 150 output from the optical junction 308. The optical junction 340 may be an optical splitter, tap, or circulator. The optical junction 340 is coupled to filter 342. The filter 342 may be a narrow linewidth optical filter, which passes a filtered version of the output pulse 338 to a photo detector 344. By measuring the intensity of light reaching the photo detector 344, feedback logic 346 can determine whether the signal width is greater than the passband of the filter 342. The feedback logic 346 can generate commands to drive the feedback command link 188 to adjust compensation in the chromatic dispersion compensator 174. The feedback logic 346 may drive the feedback command link 188 at a relatively slow rate (e.g., approximately a millisecond update rate) to allow time for mechanical stretching or contracting of the compensating optical fiber 305. The chromatic dispersion compensator 174 is adjusted until the received signal is at its peak value, indicating that the entire width of output pulse 338 is less than that of the filter 342. The feedback logic 346 may be implemented using one or more digital signal processors (DSPs), general-purpose processors, or dedicated circuitry. The feedback logic 346 can perform in real-time during exchanges in the synchronous time protocol on the bidirectional computer data communication link 136.

Although FIG. 3 depicts 3 stretch apparatuses 320-324, it will be understood that any number of stretch apparatuses can be used to further subdivide the compensating optical fiber 305 into any number of adjustable segments. In an alternate embodiment, the optical junctions 308 and 340 are merged to integrate the chromatic dispersion compensator 174 with the feedback control 182. In another alternate embodiment, the stretch apparatuses 320-324 are driven in an open loop mode without monitoring the output of the chromatic dispersion compensator 174. In this mode of operation, the feedback control 182 can be omitted, and the stretch controller 318 may be driven by other means, such as an internal scheduler of the chromatic dispersion compensator 174 or servicing equipment.

Figure 4:
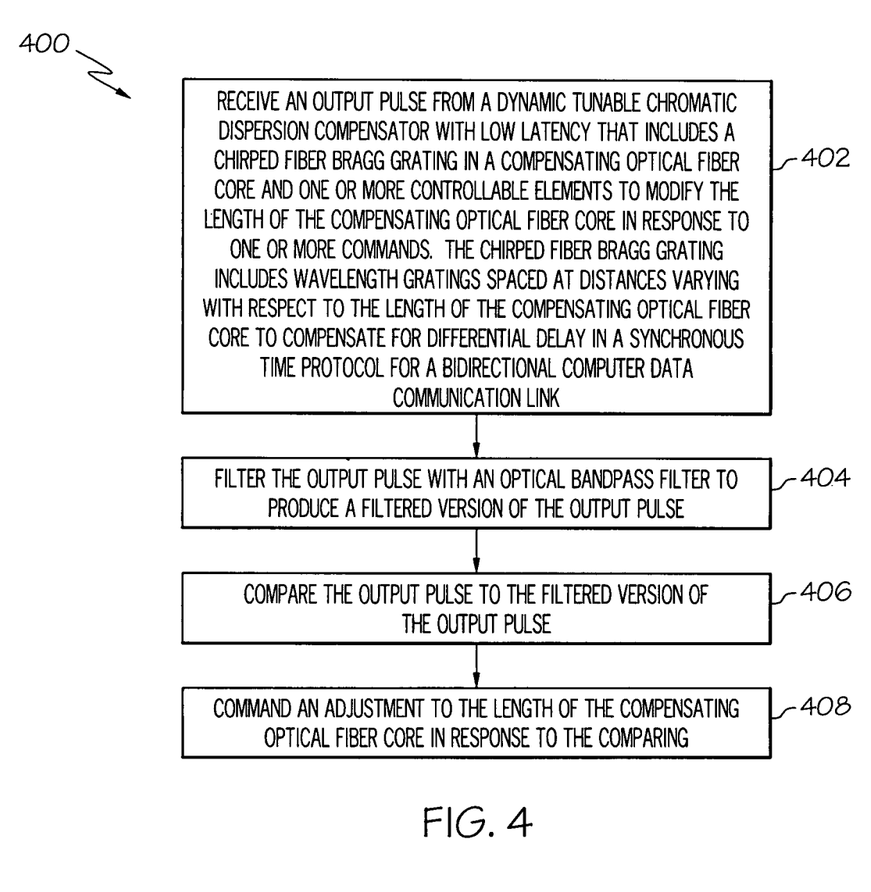
FIG. 4 depicts an exemplary process for dynamically tuning a low latency chromatic dispersion compensator.

Turning now to FIG. 4, a process 400 for dynamically tuning a chromatic dispersion compensator with low latency will now be described in accordance with exemplary embodiments, and in reference to FIGS. 1-3. Although the process 400 can be applied to a variety of configurations, such as those depicted in FIGS. 2 and 3, the process 400 is described primarily in reference to FIG. 2 for ease of explanation. At block 402, feedback control 180 receives output pulse 224 from chromatic dispersion compensator 172. As previously described in reference to FIG. 2, the chromatic dispersion compensator 172 is dynamically tunable with low latency and includes chirped fiber Bragg grating 206 in compensating optical fiber core 210. The chirped fiber Bragg grating 206 includes wavelength gratings 212-216 (refractive index perturbations) spaced at distances varying with respect to the length 226 of the compensating optical fiber core 210 to compensate for differential delay in a synchronous time protocol for bidirectional computer data communication link 136. The chromatic dispersion compensator 172 also includes one or more controllable elements (e.g., heaters 230-234) to modify the length 226 of the compensating optical fiber core 210 in response to one or more commands. The compensating optical fiber core 210 may be partitioned into segments (e.g., segments 236-240) that are adjusted by the one or more controllable elements in response to the one or more commands.

If the compensating optical fiber 205 is uniformly heated or stretched, the period of the chirped fiber Bragg grating 206 is changed, and accordingly the Bragg reflection wavelength is also changed, but the dispersion remains unchanged. Non-uniform heating or stretching can be used to change the dispersion characteristics. Increasing heat causes expansion of the length 226, while decreasing heat results in a reduction of the length 226. Calibrating the chromatic dispersion compensator 172 to center at a temperature above nominal enables control of both expansion and contraction by increasing or decreasing heat. The one or more controllable elements may be heaters 230-234, stretch apparatuses 320-324, and other elements known in the art to modify the length 226 in a predictable and repeatable manner.

At block 404, the feedback control 180 filters the output pulse 224 with filter 246 (an optical bandpass filter) to produce a filtered version of the output pulse 224. At block 406, the feedback logic 242 of the feedback control 180 compares the output pulse 224 to the filtered version of the output pulse 224. At block 408, the feedback logic 242 commands an adjustment to the length 226 of the compensating optical fiber core 210 in response to the comparing, as the one or more commands on feedback command link 186. The process 400 can be performed in real-time during exchanges in the synchronous time protocol on the bidirectional computer data communication link 136.

The chromatic dispersion compensator 172 reduces chromatic dispersion of the optical pulse (e.g., input pulse 202) received from the bidirectional computer data communication link 136 via reflecting longer wavelengths of the optical pulse through an optically shorter path (e.g., $\lambda_1$ through optically shorter path 218) of the chirped fiber Bragg grating 206 and reflecting shorter wavelengths of the optical pulse through an optically longer path (e.g., $\lambda_2$ through optically longer path 220) of the chirped fiber Bragg grating 206.

A bidirectional computer data communication link may contain multiple chromatic dispersion compensators, which can vary in design characteristics. For example, chromatic dispersion compensators 172, 174, and 176 of FIG. 1 can use different types of optical junctions 208, have different lengths 226 of the compensating optical fiber core 210, and/or different degrees of chromatic dispersion compensation using one or more controllable elements. However, the net effect of inserting the chromatic dispersion compensators 172, 174, and 176 into communication paths between the servers 102 and 104 is increased throughput at longer distances than could otherwise be achieved, while minimizing the differential latency impact between each direction of the bidirectional computer data communication links 136 and 138.

Technical effects include providing a dynamic frequency tunable low latency chromatic dispersion compensator for latency-sensitive networks. The use of a chirped fiber Bragg grating compensates for chromatic dispersion that can occur when transmitting multiple wavelengths and/or frequencies over long distances. Dynamic adjustments to the length of the chirped fiber Bragg grating enables shifts in dispersion characteristics to be accounted for on the fly. Using multiple heaters and/or stretch apparatuses for segments of the chirped fiber Bragg grating results in a higher degree of control over shifting of specific wavelengths/frequencies. The dynamic frequency tunable low latency chromatic dispersion compensator allows high bandwidth, latency sensitive communication to continue, even as variations in the bidirectional link occur over time.

The capabilities of the present invention can be implemented in software, firmware, hardware or some combination thereof, such as the feedback logic 242 and 346 of FIGS. 2 and 3, as well as the stretch control 318 of FIG. 3.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), a digital versatile disc (DVD), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A dynamic tunable chromatic dispersion compensator with low latency comprising:
    a chirped fiber Bragg grating in a compensating optical fiber core, the chirped fiber Bragg grating comprised of wavelength gratings spaced at distances varying with respect to the length of the compensating optical fiber core to compensate for differential delay in a synchronous time protocol for a bidirectional computer data communication link;
    one or more controllable elements to modify the length of the compensating optical fiber core in response to one or more commands;
    a first optical junction to optically couple the chirped fiber Bragg grating to an optical fiber of the bidirectional computer data communication link; and
    a second optical junction optically coupled to a feedback control;
    wherein an optical signal travels through the first optical junction, and the Bragg grating of the compensating optical fiber, and then through the second optical junction, the one or more commands generated by the feedback control that measures an output pulse of the compensating optical fiber core relative to a filtered version of the output pulse received through the second optical junction to determine one or more adjustments to the length of the compensating optical fiber core.

2. The dynamic tunable chromatic dispersion compensator of claim 1 wherein the compensating optical fiber core is partitioned into segments that are adjusted by the one or more controllable elements in response to the one or more commands.

3. The dynamic tunable chromatic dispersion compensator of claim 1 wherein the one or more controllable elements are one or more heaters that modify the length of the compensating optical fiber core thermally.

4. The dynamic tunable chromatic dispersion compensator of claim 1 wherein the one or more controllable elements are stretch apparatuses that modify the length of the compensating optical fiber core mechanically.

5. The dynamic tunable chromatic dispersion compensator of claim 1 wherein the chirped fiber Bragg grating is in a serpentine configuration.

6. The dynamic tunable chromatic dispersion compensator of claim 1 wherein the feedback control is comprised of:
   a filter to generate the filtered version of the output pulse;
   a photo detector to measure intensity of the filtered version of the output pulse; and
   feedback logic to determine the one or more adjustments.

7. The dynamic tunable chromatic dispersion compensator of claim 1 wherein the chirped fiber Bragg grating reduces chromatic dispersion of an optical pulse received at the dynamic tunable chromatic dispersion compensator from the optical fiber coupled to the optical junction via reflecting longer wavelengths of the optical pulse through an optically shorter path of the chirped fiber Bragg grating and reflecting shorter wavelengths of the optical pulse through an optically longer path of the chirped fiber Bragg grating.

8. The dynamic tunable chromatic dispersion compensator of claim 7 wherein the optical pulse includes synchronous time protocol data in the shorter wavelengths and in the longer wavelengths.

9. A system comprising:
   an optical fiber in a bidirectional computer data communication link to support optical communication between servers; and
   a dynamic tunable chromatic dispersion compensator coupled to the optical fiber, the dynamic tunable chromatic dispersion compensator having a low latency, comprising:
   a chirped fiber Bragg grating in a compensating optical fiber core, the chirped fiber Bragg grating comprised of wavelength gratings spaced at distances varying with respect to the length of the compensating optical fiber core to compensate for differential delay in a synchronous time protocol for a bidirectional computer data communication link;
   one or more controllable elements to modify the length of the compensating optical fiber core in response to one or more commands;
   a first optical junction optically coupling the chirped fiber Bragg grating to the optical fiber in the bidirectional computer data communication link; and
   a second optical junction optically coupled to a feedback control;
   wherein an optical signal travels through the first optical junction, and the Bragg grating of the compensating optical fiber, and then through the second optical junction, the one or more commands generated by the feedback control that measures an output pulse of the compensating optical fiber core relative to a filtered version of the output pulse received through the second optical junction to determine one or more adjustments to the length of the compensating optical fiber core.

10. The system of claim 9 wherein the compensating optical fiber core is partitioned into segments that are adjusted by the one or more controllable elements in response to the one or more commands.

11. The system of claim 10 wherein the one or more controllable elements are one or more heaters that modify the length of the compensating optical fiber core thermally.

12. The system of claim 10 wherein the chirped fiber Bragg grating is in a serpentine configuration and the one or more controllable elements are stretch apparatuses that modify the length of the compensating optical fiber core mechanically.

13. The system of claim 9 further comprising a feedback control, wherein the feedback control is comprised of:
   a filter to generate a filtered version of an output pulse of the compensating optical fiber core;
   a photo detector to measure intensity of the filtered version of the output pulse; and
   feedback logic to determine one or more adjustments to the length of the compensating optical fiber core as a function of the measured intensity of the filtered version of the output pulse relative to the output pulse.

14. A method comprising:
   receiving an output pulse from a dynamic tunable chromatic dispersion compensator with low latency, the dynamic tunable chromatic dispersion compensator comprised of:
   a chirped fiber Bragg grating in a compensating optical fiber core, the chirped fiber Bragg grating comprised of wavelength gratings spaced at distances varying with respect to the length of the compensating optical fiber core to compensate for differential delay in a synchronous time protocol for a bidirectional computer data communication link; and
   one or more controllable elements to modify the length of the compensating optical fiber core in response to one or more commands;
   passing the output pulse through a first optical junction optically coupled to a bandpass filter;
   filtering the output pulse with an optical bandpass filter to produce a filtered version of the output pulse;
   passing, responsive to the filtering, the output pulse through a second optical junction to a feedback control;
   comparing, by the feedback control, the output pulse to the filtered version of the output pulse; and
   commanding an adjustment to the length of the compensating optical fiber core in response to the comparing.

15. The method of claim 14 wherein the compensating optical fiber core is partitioned into segments that are adjusted by the one or more controllable elements in response to the one or more commands.

16. The method of claim 14 wherein the one or more controllable elements are one or more heaters that modify the length of the compensating optical fiber core thermally.

17. The method of claim 14 wherein the one or more controllable elements are stretch apparatuses that modify the length of the compensating optical fiber core mechanically.

18. The method of claim 14 wherein the method is performed by a feedback control in communication with the dynamic tunable chromatic dispersion compensator.

19. The method of claim 14 wherein the commanding is performed in real-time during exchanges in the synchronous time protocol on the bidirectional computer data communication link.

* * * * *